(12) United States Patent
Berndtson

(10) Patent No.: US 6,516,547 B2
(45) Date of Patent: Feb. 11, 2003

(54) LAMINATED COUNTRY MAP OR ROAD MAP

(75) Inventor: Kay Berndtson, Schoengeising (DE)

(73) Assignee: Berndtson & Berndtson GmbH, Fuerstenfeldbruck (DE)

( * ) Notice: Subject to any disclaimer, the term of this patent is extended or adjusted under 35 U.S.C. 154(b) by 0 days.

(21) Appl. No.: 09/736,616

(22) Filed: Dec. 14, 2000

(65) Prior Publication Data

US 2001/0003877 A1 Jun. 21, 2001

(30) Foreign Application Priority Data

Dec. 16, 1999 (DE) .................................... 299 22 139 U

(51) Int. Cl.⁷ ............................................. G09B 29/00
(52) U.S. Cl. ...................... 40/124.09; 283/34; 283/35
(58) Field of Search ......................... 40/124.09; 283/34, 283/35

(56) References Cited

U.S. PATENT DOCUMENTS

| | | | | |
|---|---|---|---|---|
| 1,853,829 A | * | 4/1932 | Maury | 283/34 |
| 5,063,637 A | * | 11/1991 | Howard, Jr. et al. | 283/34 |
| 5,234,231 A | * | 8/1993 | Hollander et al. | 283/34 |
| 5,868,429 A | * | 2/1999 | Raymond et al. | 283/34 |
| 5,924,812 A | * | 7/1999 | Goldman | 281/38 |

* cited by examiner

Primary Examiner—Cassandra H. Davis
(74) Attorney, Agent, or Firm—Andrew N. Parfomak; Norris, McLaughlin & Marcus

(57) ABSTRACT

A map, having a printed map sheet made of paper sheet and having a printed image and transparent plastic films applied either as a laminate or as a lining, optionally PET film, on the front and reverse sides of the map sheet, also has fold lines of a fanfold extending in one direction. At least two cross fold lines extend perpendicular to the fold lines of the fanfold, optionally central of the map sheet. A web or spine portion of the map sheet, located between the cross fold lines, can bear a printed title for the map. The cross fold lines can form a spine for the map when the map is folded perpendicular to the fold lines of the fanfold along the two cross fold lines. A range for the space between the cross fold lines can be selected, and that range can be from 2 to 20 mm. Embossed lines in the map sheet or in the plastic films can predefine the fold lines of the fanfold and the cross fold lines. Optionally, in a map in which a web portion of the web sheet remains between the grooves defining the cross fold lines, an elongate opening in the map sheet can be located between the grooves adjacent the web portion.

15 Claims, 3 Drawing Sheets

LAMINATED COUNTRY MAP OR ROAD MAP

Figure 1:

The invention relates to a laminated map with a geographical definition of the locality, e.g. a country map, street map, road map or city map.

Known maps are of various designs, the predominant design being those where the map sheet is made of paper or card of appropriate dimension, mostly of rectangular shape. Such maps wear comparatively quickly. For said reason, maps are known where the paper/card sheet is coated, enclosed in a film or mostly lined/laminated on both sides. With said known maps the map sheet is, for example, first provided with shorter or longer narrow slits in the fold lines, then laminated and subsequently folded by hand. On the other hand, there are individual constructions, where continuous map sheets are manually lined/laminated and then folded—mostly, in a not very orderly fashion. None of said known laminated maps may be mechanically folded.

It is an object of the present invention is to provide a construction for a laminated map obviating the above-mentioned drawbacks.

It is a further object of the invention to provide map constructions which permit orderly mechanical machine folding of the laminated map sheet.

It is a further object of the invention to provide map constructions which allow for easy shelving and still recognition of the content of the map, In general, this invention provides a map which is easy to manufacture including its folding on a machine and needs no additional manual finishing.

To achieve these and related objects the present invention provides two constructions of a map, such as a country map, street map, city map or otherwise a printed map sheet.

A first and a second embodiment of the invention includes a map comprising a printed map sheet made of paper sheet having fanfold lines extending in one direction of the map sheet and at least one cross fold line (rectangular fold line) extending perpendicular to the direction of the fanfold lines and further having transparent plastic films applied as a laminate or lining on the front and on the reverse side of the map sheet.

In the first form of construction, it is provided according to the invention that the fold lines of the fanfold are predefined by embossed grooves in the map sheet and that an elongate opening 2–20 mm in width is formed in the region of a—preferably central—cross fold of the map sheet extending perpendicular to the fold lines of the fanfold of the map sheet, which elongate opening is overlapped by the plastic films, and that at a narrow side of said elongate opening in extension of the latter a web of the same width as the opening is left, which is imprintable with a map title and which is delimited on either side by an embossed groove, the printed image of the map being interrupted in the region between the two embossed grooves and the elongate opening. The map may alternatively have one or more further cross folds parallel to the previously described cross fold.

In the other form of construction, it is provided according to the invention that the fold lines of the fanfold are predefined by means of grooves embossed in the plastic films, and that in the region of a—preferably central—cross fold of the map two grooves are embossed in the plastic films 2 to 20 mm apart, along which grooves the map is folded perpendicular to the fold lines of the fanfold, and that a map spine is formed in the region between said two outer map surfaces, the spine formed in the map sheet being imprintable with a map title.

The plastic films applied as a laminate are advantageously PET films (polyethylene terephthalate film) suitable for hot lamination but may alternatively be OPP films (oriented polypropylene film) for cold lamination. Other known laminating films may be considered.

The invention therefore provides on the one hand means of predefining the folding, which allow mechanical folding, and on the other hand means of providing an imprintable spine, which produce in the finished map in the region of the cross fold a narrow map spine, on which an indication of the map contents may be provided. The map is moreover also easily foldable here. Said narrow map spine in the region of the cross fold is of paramount importance for the sale of the map because almost all maps are sold positioned vertically in slipcases, drawers or boxes and so only the narrow map spine remains visible. The invention moreover provides that the map is printed on a paper sheet, which has a weight of at least 100 g/m², and is folded at the one fold direction into a plurality of fanfolds and at the other fold direction into one or more cross folds. Without special means a paper sheet of said paper grammage, which is lined on both sides with a plastic film, need no longer be mechanically folded using any of the common folding methods. It is therefore provided that the printed map sheet or paper sheet has the two features peculiar to the invention.

a) Construction Having an Elongate Opening and Twin-groove in the Region of the Cross Fold In the region of the cross fold or better "twin-fold", the map has an elongate opening in the printed image. There, the printed paper sheet prior to lining/laminating is grooved, punched and broken out to expose the opening. The arrangement of grooves is peculiar to the invention. A single groove is provided in the region of each fold line of the fanfold and two spaced-apart grooves are provided in the region of the, preferably central, cross fold web. This enables subsequent mechanical folding of the map. In said manner, there arises between the adjacent fold lines of the cross fold an elongate opening, which is spanned by the plastic film laminated onto both sides. The opening between said fold lines is provided in such a way that, when the map is completely folded, there arises in the region of the cross fold in the outermost layer the narrow paper spine or map spine, which is at least 2 mm and at most 20 mm wide. The folded edges lying underneath are situated in the region of the opening and comprise plastic film laminated onto both sides. The opening has in said case a width of at least 2 mm and at most 20 mm. Mostly, at least one and up to 12 fold lines are provided for the fanfold.

b) Construction Having a Twin-groove in the Region of the Cross Fold

The map has a continuous printed image. The printed paper sheet after having been lined/laminated is provided in the region of the cross fold with two grooves spaced 2 to 20 mm apart by embossing the plastic film. This allows subsequent mechanical folding of said map. What is special here is that in the region of the cross fold as a result of the spaced-apart grooves, the so-called twin-groove, a stable narrow spine at least 2 mm and at most 20 mm in width arises in the completely folded map. The map mostly has at least 1 and up to 12 fold lines forming the fanfold.

Figure 2:
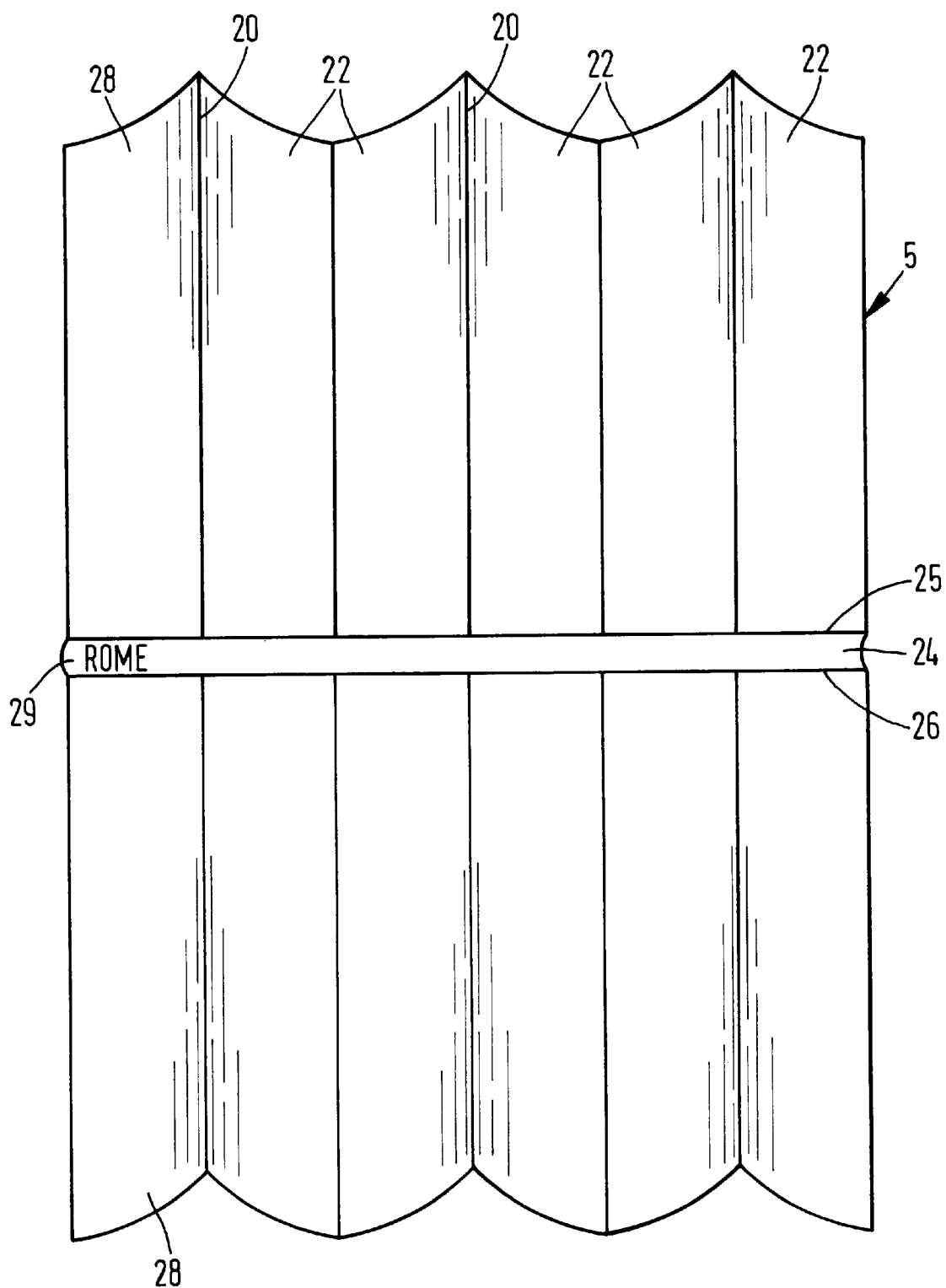

An illustrative and presently preferred embodiment of the invention is described in detail with reference to the accompanying drawings, which show:

FIG. 1 in cavalier perspective a map according to the invention,

FIG. 2 a map having an elongate opening in the cross fold, and

Figure 3:
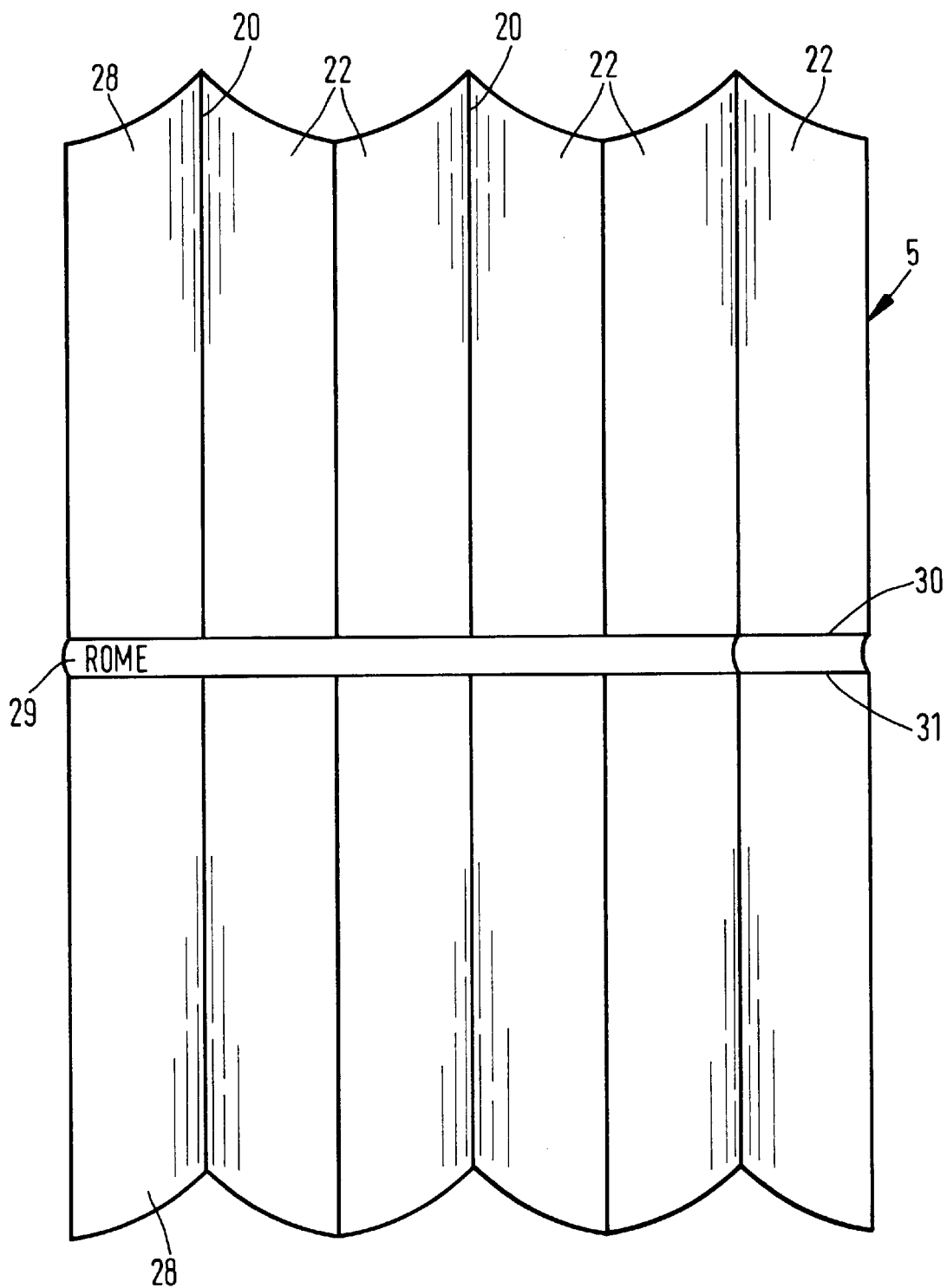

FIG. 3 a map having a twin-groove in the entire fold.

FIG. 1 shows a folded-up city map 1 of Rome, which vertically has a fanfold and horizontally has a cross or right angle fold, wherein the folding is such as to form at the top a narrow spine 2 which is imprinted on the paper sheet with an indication of the map contents so that, when the maps are stacked one on top of the other or next to one another like books, the short title may be read. Folds 3 of the map 1 are shown positioned slightly apart in the drawing.

The map 1 comprises a rectangular map sheet 5 made of paper sheet, which is lined or laminated on either side with a smooth PET plastic film 6, and is therefore glossy and insensitive to dirt. The durability of the map is thereby increased in a known manner.

From the middle map fold it may be seen that the plastic film applied as a laminate forms narrow fold lines 20.

It is evident from FIG. 2 that along the horizontal center in the region of the two×five rectangular map surfaces 22 an elongate opening 24 or punched hole is provided in the map sheet 5 and is spanned on either side by a laminating film. The map print situated on said map surfaces 22 is interrupted on either side of the opening 24 in the cross fold, i.e. is continued in each case at the other edge 25, 26. Between the two left map surfaces 28 there is not an interruption of the map sheet but a web 29 so that on the map spine 2 formed there an indication of the map contents, e.g. "ROME", may be printed.

In the case of the map according to FIG. 3 depicting construction b, the paper sheet has no elongate opening as in the map of FIG. 2 and the map image is not interrupted in the central horizontal region, i.e. in the cross fold, even when grooves 30 and 31 (twin-groove) as shown are embossed in the plastic film in the region where edges 25, 26 of the elongate opening 24 or punched hole would have been if a map sheet 5 according to FIG. 2 was used. This construction in the course of horizontal folding likewise gives rise to a map spine 2 as in the construction according to FIG. 2. Between the two left map surfaces 28 there is left between the grooves 30 and 31 a web region 29 of the map spine for imprinting the map title, preferably on the map sheet.

What is claimed is:

1. A map, comprising:

a printed map sheet, made of paper sheet, having a printed image on a side thereof, said map sheet further having front and reverse sides, and a first plurality and a second plurality of embossed grooves in the map sheet;

fold lines of a fanfold, defined by the first plurality of embossed grooves, and extending in one direction of the map sheet;

first and second cross fold lines extending perpendicular to the direction of the fold lines of the fanfold and spaced 2–20 mm apart; and transparent plastic films applied as one selected from the following group: a laminate and a lining, on the front and on the reverse side of the map sheet;

wherein the map sheet defines an elongate opening in the space between the first and second cross fold lines, and the plastic films overlap the elongate opening; and wherein first and second embossed grooves of the second plurality, respectively collinear with the first and second cross fold lines, define a web portion of the map sheet that is adjacent to the elongate opening and imprintable with a map title, the printed image of the map being interrupted between the first and second embossed grooves and in the region of the elongate opening.

2. The map according to claim 1 wherein the cross-fold lines are substantially central of the map sheet.

3. The map according to claim 1, wherein the plastic films are applied as a laminate and are PET films.

4. A map, comprising:

a printed map sheet, made of paper sheet, and having a printed image on a side thereof, said map sheet further having front and reverse sides;

fold lines of a fanfold extending in one direction of the map sheet;

first and second cross fold lines extending perpendicular to the direction of the fold lines of the fanfold and spaced 2–20 mm apart; and transparent plastic films applied as one selected from the following group: a laminate and a lining, on the front and on the reverse side of the map sheet;

wherein embossed grooves in the plastic films predefine the fold lines of the fanfold and the cross fold lines; and wherein the map sheet and the plastic films are foldable along the first and second cross fold lines perpendicular to the fold lines of the fanfold to form a map spine, located between the cross-fold lines and containing a spine portion of the map sheet imprintable with a map title.

5. The map according to claim 4 wherein the cross fold lines are substantially central of the map sheet.

6. The map according to claim 4, wherein the plastic films are applied as a laminate and are PET films.

7. A map, comprising:

a map sheet, made of paper sheet, having a printed image on a surface thereof and said map sheet having front and reverse surfaces;

a first plurality of fold lines in the map, extending in a first direction, including at least parallel first and second cross fold lines;

a second plurality of fold lines in the map, perpendicular to and crossing the cross fold lines, defining a fanfold in the map;

first and second portions of the front surface of the map sheet, respectively adjacent to the first and second cross fold lines and extending in opposite directions therefrom, and located next proximate to and on the on the same side of a first fanfold line of the second plurality of fold lines;

a third imprinted web portion of the front surface of the map sheet, defined by and located between the first and second cross fold lines, and between the first and second portions of the front surface of the map sheet;

wherein the map is foldable along the first and second cross fold lines to form a map spine between the first and second portions of the front surface of the map sheet, such that the first portion, second portion, and third imprinted web portion of the front surface of the map sheet face outward of the cross folded map.

8. The map of claim 7 wherein the first and second cross fold lines are separated by a space having a width selected from the range of about 2 mm to about 20 mm.

9. The map of claim 7, wherein the plastic film is applied as a laminate, and is PET film.

10. The map of claim 7, wherein the printed image appears on the reverse surface of the map.

11. The map of claim 7, wherein the weight of the map sheet is at least 100 g/m2.

12. The map of claim 7, wherein grooves embossed in the plastic films predefine the first plurality and second plurality of fold lines in the map.

13. The map of claim 7, wherein the map sheet defines an elongate opening in the space between the first and second cross fold lines adjacent the third imprinted web portion of the front surface of the map sheet, and the plastic films span the elongate opening.

14. The map of claim 13, wherein the printed image appears on the reverse surface of the map, interrupted between the first and second cross fold lines in the map.

15. The map of claim 13, wherein grooves embossed in the map sheet predefine the first and second plurality of fold lines in the map.

* * * * *